United States Patent
Nitsche et al.

(10) Patent No.: US 8,454,415 B2
(45) Date of Patent: Jun. 4, 2013

(54) SUPPLY CHANNEL COMPRISING AN AIR DISTRIBUTION SYSTEM FOR VEHICLES, AIRCRAFT HAVING SUCH A SUPPLY CHANNEL, AND METHOD FOR PRODUCING A SUPPLY CHANNEL

(75) Inventors: Anja Nitsche, Hamburg (DE); Markus Horst, Bad Oldesloe (DE); Hannes Hedemann, Oyten (DE); David Geibel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 575 days.

(21) Appl. No.: 12/566,207

(22) Filed: Sep. 24, 2009

(65) Prior Publication Data

US 2010/0087130 A1   Apr. 8, 2010

Related U.S. Application Data

(63) Continuation of application No. PCT/EP2008/053487, filed on Mar. 25, 2008.

(60) Provisional application No. 60/896,978, filed on Mar. 26, 2007.

(30) Foreign Application Priority Data

Mar. 26, 2007   (DE) .......................... 10 2007 014 406

(51) Int. Cl.
*B64D 13/00* (2006.01)
(52) U.S. Cl.
USPC ........................................................ 454/76

(58) Field of Classification Search
USPC .................. 454/71, 72, 73, 74, 76, 305, 284, 454/292, 69, 296
See application file for complete search history.

(56) References Cited

U.S. PATENT DOCUMENTS

| | | | | |
|---|---|---|---|---|
| 3,363,532 | A * | 1/1968 | Horneff | 454/187 |
| 6,602,128 | B1 * | 8/2003 | Spengler | 454/187 |
| 7,517,279 | B2 * | 4/2009 | Kober et al. | 454/155 |
| 2004/0089007 | A1 * | 5/2004 | Umebayashi et al. | 62/244 |

FOREIGN PATENT DOCUMENTS

| | | |
|---|---|---|
| DE | 3526880 A1 | 2/1987 |
| DE | 4236411 A1 | 5/1994 |
| DE | 10140985 A1 | 3/2003 |
| EP | 0678408 A1 | 10/1995 |
| GB | 1040469 A | 8/1966 |
| WO | 2007006264 A1 | 1/2007 |

* cited by examiner

*Primary Examiner* — Steven B McAllister
*Assistant Examiner* — Brittany E Towns
(74) *Attorney, Agent, or Firm* — Ingrassia Fisher & Lorenz, P.C.

(57) ABSTRACT

A supply channel is provided with an air distribution system for vehicles, in particular for aircraft. The supply channel includes, but is not limited to an elongated housing, a hollow profile extending in longitudinal direction of the housing, and at least one air shower that includes, but is not limited to an air inlet and at least one air outlet. A generated surface of the hollow profile includes, but is not limited to a multitude of perforation openings. The at least one is designed such that in a region of the air inlet it rests tightly against the generated surface of the hollow profile. Perforation openings that do not lead to an air inlet of an air shower can be sealed off by an adhesive film or foil that has been applied. The supply channel makes possible variable positioning of air showers along the longitudinal direction of the supply channel.

12 Claims, 6 Drawing Sheets

SUPPLY CHANNEL COMPRISING AN AIR DISTRIBUTION SYSTEM FOR VEHICLES, AIRCRAFT HAVING SUCH A SUPPLY CHANNEL, AND METHOD FOR PRODUCING A SUPPLY CHANNEL

CROSS-REFERENCE TO RELATED APPLICATION

This application is a continuation of International Application No. PCT/EP2008/053487, filed Mar. 25, 2008, which was published under PCT Article 21(2) and which claims priority to German Patent Application No. 102007014406.9 filed Mar. 26, 2007 and of U.S. Provisional Patent Application No. 60/896,978 filed Mar. 26, 2007, the disclosure of which applications is hereby incorporated herein by reference.

TECHNICAL FIELD

The present invention relates to a supply channel with an air distribution system for vehicles, in particular aircraft. Furthermore, the invention relates to an aircraft having such a supply channel, and to a method for producing a supply channel.

BACKGROUND

Supply channels are provided in vehicles, for example in aircraft, buses, trains etc. in order to supply, for example with fresh air or with air-conditioned air, individual or several seats arranged in the vehicle. In the supply channel further inlets and devices can be provided, for example in order to supply individual seats or groups of seats for example with current for individual seat illumination or for displays or in order to supply loudspeakers integrated in the supply channel with corresponding electrical signals.

In order to be able to feed fresh air or air-conditioned air to the seats of the vehicle, usually an air distribution system is integrated in the supply channel. Such an air distribution system conventionally comprises a central tube which at an air inlet nozzle is connected to a source for fresh air or air-conditioned air, and on which tube air outlet pieces are provided, in each case approximately above the positions of the seats in the vehicle. On the air outlet pieces, hoses are affixed, which lead the air to air showers that are arranged above the seats.

In conventional supply channels the air showers are provided on fixed positions above the seats, with said air showers, as a rule, being arranged at a constant space from each other. Accordingly, the air outlet pieces in the air distribution system are also at fixed positions.

In order to meet various conditions of use, in vehicles, in particular in aircraft, it is becoming increasingly important for the position of seats and the space between seat rows to be able to be variably adjusted. To this effect the seats can, for example, be displaced along rails along the longitudinal axis of the vehicle. Since the air outlet pieces in conventional air distribution systems are fixed, up to now this has been associated with a problem in that adjustment, to the different positions of the seats, of the position of the air showers was only possible with considerable installation expenditure. To this effect, for example, connecting hoses of various lengths had to be provided between the air outlet pieces and the air showers.

There may thus be a requirement for providing a supply channel with an air distribution system for vehicles, in particular aircraft, in which air distribution system, in particular, the above-mentioned disadvantages of conventional supply channels are at least in part avoided. There may, in particular, be a requirement to provide a supply channel with an air distribution system, in which air distribution system the position of air showers can be varied with little installation expenditure. Furthermore, there may be a requirement to provide an aircraft comprising such a supply channel and to provide a method for providing such a supply channel.

SUMMARY

According to a first aspect of the present invention, a supply channel with an air distribution system for vehicles is provided, which supply channel comprises an elongated housing, a hollow profile extending in longitudinal direction of the housing, and at least one air shower comprising an air inlet and at least one air outlet. In this arrangement the hollow profile along a generated surface/shell comprises a multitude of perforation openings. Furthermore, the at least one air shower is designed, in a region of its air inlet, to rest tightly against the generated surface of the hollow profile.

Features, characteristics, advantages and alternative embodiments of the invention are stated below.

Apart from providing fresh air or air-conditioned air to the seats of the vehicle, the supply channel can also be used to supply other media or information. For example, power cables can be installed in the supply channel in order to supply reading lamps above the seats with electricity, or in order to be able to activate signal displays above the seats. As an option, loudspeakers, displays or hatracks can also be integrated in the supply channel or can be mounted to the supply channel.

The supply channel can preferably extend parallel to the longitudinal axis of the vehicle and can thus supply a plurality of seat rows, arranged one behind the other, with air. As an alternative, the supply channel can also extend across the longitudinal axis of the vehicle and supply air to individual seats of a row of seats that are arranged one beside the other.

The housing of the supply channel can be designed as a C-profile, in other words it can comprise a "C"-shaped cross section, and the closed side of the "C" can be attached to the ceiling of the vehicle, and the open side can be directed towards the bottom to the seats. Air showers can be slid into or fastened to the C-profile. Trim panel elements can be provided between the air showers in order to prevent the C-profile and the components of the air distribution system or other supply systems from being exposed to view.

As an alternative the housing can also be designed as an enclosed tubular structure.

In longitudinal direction of the housing and preferably within the housing a hollow profile extends. This hollow profile forms part of the air distribution system. The hollow profile can be designed as an elongated tube, for example comprising a round, oval or rectangular profile cross-section.

In a generated surface of the hollow profile a multitude of perforation openings are provided. The perforation openings can be small, for example round, openings comprising a cross-sectional area of a few square millimeters. A multitude of such openings can be provided in longitudinal direction of the hollow profile one behind the other, and along the width of the hollow profile one beside the other so that a sheet-like pattern of perforation openings results.

As an alternative the perforation openings can also be designed as narrow elongated slots of a width of a few mm to a few cm, with the longitudinal direction of said slots preferably extending across the longitudinal direction of the hollow profile.

In or on the housing at least one air shower or preferably a multitude of air showers is/are arranged. Each air shower comprises an air inlet which in the installed state rests against the generated surface of the hollow profile so as to be airtight. The air inlet is in flow connection with an air outlet that is directed towards the seat arranged under the air shower. In this way air that has been fed into the hollow profile at one position can be guided, through the perforation openings, the air inlet and the air outlet of the air shower, up to the seats arranged below.

The air shower can also be designed as an air shower unit with a shared air inlet or possibly several air inlets that can all rest against the generated surface of the hollow profile, and it can be designed with a multitude of air outlets, wherein each air outlet can be allocated to an individual seat.

By providing a multitude of perforation openings in the generated surface of the hollow profile, and as a result of the air inlet of the individual air showers resting directly against the hollow profile it is possible for the positions of the air showers to be variably selected. Essentially, an air shower can be held on the hollow profile at any desired position along the longitudinal direction of said hollow profile and can thus match the position of a seat that is slidable along the longitudinal direction of the vehicle.

According to one embodiment, a cross-sectional area of a perforation opening is smaller than a cross-sectional area of the air inlet of an air shower. In other words the cross section of the air inlet need not correspond to that of an opening in the hollow profile that is used to supply air; instead the air inlet can overlap one or several perforation openings.

According to a further embodiment, the position, cross section and/or size of the perforation openings in the generated surface of the hollow profile are/is such that in an installed state of the supply channel, in other words when the air inlet of an air shower rests against the generated surface of the hollow profile, several perforation openings lead into the air inlet of an air shower. In this way a situation can be achieved in which on the one hand many perforation openings can be arranged one behind the other at close spacing along the longitudinal direction of the hollow profile, and thus the air shower can be arranged at a small pitch so as to variably rest against the hollow profile along the longitudinal direction, which improves the variability of positioning of the air shower, while on the other hand sufficient air can be conveyed to the air outlet through the multitude of perforation openings that lead into the inlet of an air shower.

According to a further embodiment, the perforation openings are designed so that in longitudinal direction they are equidistant along the generated surface of the hollow profile. By designing the perforation openings so that they are equidistant from each other, with the distance being, for example, in the region of a few cm, and in particular less than 10 cm, the variability of the positioning of the air showers can be improved while at the same time the hollow profile is simple to produce.

According to a further embodiment, the supply channel further comprises a cover device for the airtight covering of perforation openings that do not lead into an air inlet of an air shower. This cover device can prevent uncontrolled issue of air from the perforation openings that do not lead to an air shower.

According to a preferred embodiment, the cover device is simply designed in the form of an adhesive film or foil. The adhesive film or foil can simply be cut to size accordingly and can be applied over the individual perforation openings situated between individual air showers. In this way on the one hand the perforation openings can be closed off quickly and simply in an airtight manner, and on the other hand the adhesive film or foil can be removed without this creating any problems, for example in order to arrange the air showers at some other position, and subsequently a new adhesive film or foil can be applied.

According to an embodiment, the hollow profile is designed so as to form an integral part of the housing. In other words, the hollow profile is not provided as a separate element in or on the housing, but, instead, itself forms part of the housing. For example, the housing can be injection molded such that on the one hand it is a "C"-shaped profile when seen from the outside, and on the other hand in the interior of the C-profile a hollow profile, for example of oval cross section, is integrated in the C-profile. In this way on the one hand the production of the supply channel can be made significantly easier, and on the other hand the mechanical stability of the unit comprising a housing and an integrated hollow profile is improved.

According to a further embodiment, the at least one air shower comprises a seal along its air inlet. The seal can be designed as an elastic ring along the air inlet of the air shower. It can comprise a rubber-like material. Furthermore, the geometry and width of the seal can be designed such that they match the geometry and arrangement of the perforation openings in the generated surface of the hollow profile and in particular match the interspace regions between adjacent perforation openings. When the air shower is installed in the supply channel it preferably exerts pressure on the seal such that the air inlet rests in an airtight manner against the generated surface of the hollow profile. In this arrangement the seal is designed such that it preferably does not extend across perforation openings, but instead rests against the hollow profile between adjacent perforation openings.

According to a further embodiment, the supply channel further comprises a fastening device in order to fasten the air shower to the housing. In principle the air shower can also be fastened directly to the hollow profile. However, for reasons of stability and ease of installation it is preferred if the air shower is fastened to the housing of the supply channel. The fastening device can be designed as required, and preferably should provide a fastening means that can be undone again. For example, the fastening device can be designed for screwing or clamping the air shower to the housing or for spreading part of said air shower into the housing.

According to a further aspect of the present invention, an aircraft having a supply channel as described above is provided. Several seat rows, arranged one behind the other in longitudinal direction of the aircraft, can be provided in the aircraft. The seats can be slidable along longitudinal rails. In order to be able to match the position of air showers above the seats to the variable positions of the seats, the spacing of perforation openings in the hollow profile of the supply channel along the longitudinal direction of the aircraft should be as small as possible, for example significantly smaller than a provided minimum distance between adjacent seats one behind the other.

According to a further aspect of the present invention, a method for producing a supply channel comprising an air distribution system for a vehicle, in particular for an aircraft, is provided, with the method comprising the following steps: providing a supply channel as described above; arranging the at least one air shower in airtight contact to the generated surface of the hollow profile; and covering, so as to provide a seal, perforation openings of the hollow profile that do not lead into an air shower. In this arrangement the perforation openings can, for example, be sealed off by means of an adhesive film or foil. At first the air showers can be arranged on the hollow profile, followed by sealing of the perforation openings that are situated in between, or vice versa, first, perforation openings are sealed and subsequently air showers can be affixed in the region of perforation openings that are arranged in between and that have remained open. It is also imaginable that first all the perforation openings are covered with the adhesive film or foil so as to provide a seal, and subsequently, prior to installation of the air showers, to penetrate the adhesive foil above the respective perforation openings only where an air shower joins.

The characteristics of the present invention, which characteristics have been described above with reference to individual aspects and embodiments, can be combined as desired.

BRIEF DESCRIPTION OF THE DRAWINGS

The present invention will hereinafter be described in conjunction with the following drawing figures, wherein like numerals denote like elements, and.

DETAILED DESCRIPTION

Figure 1:
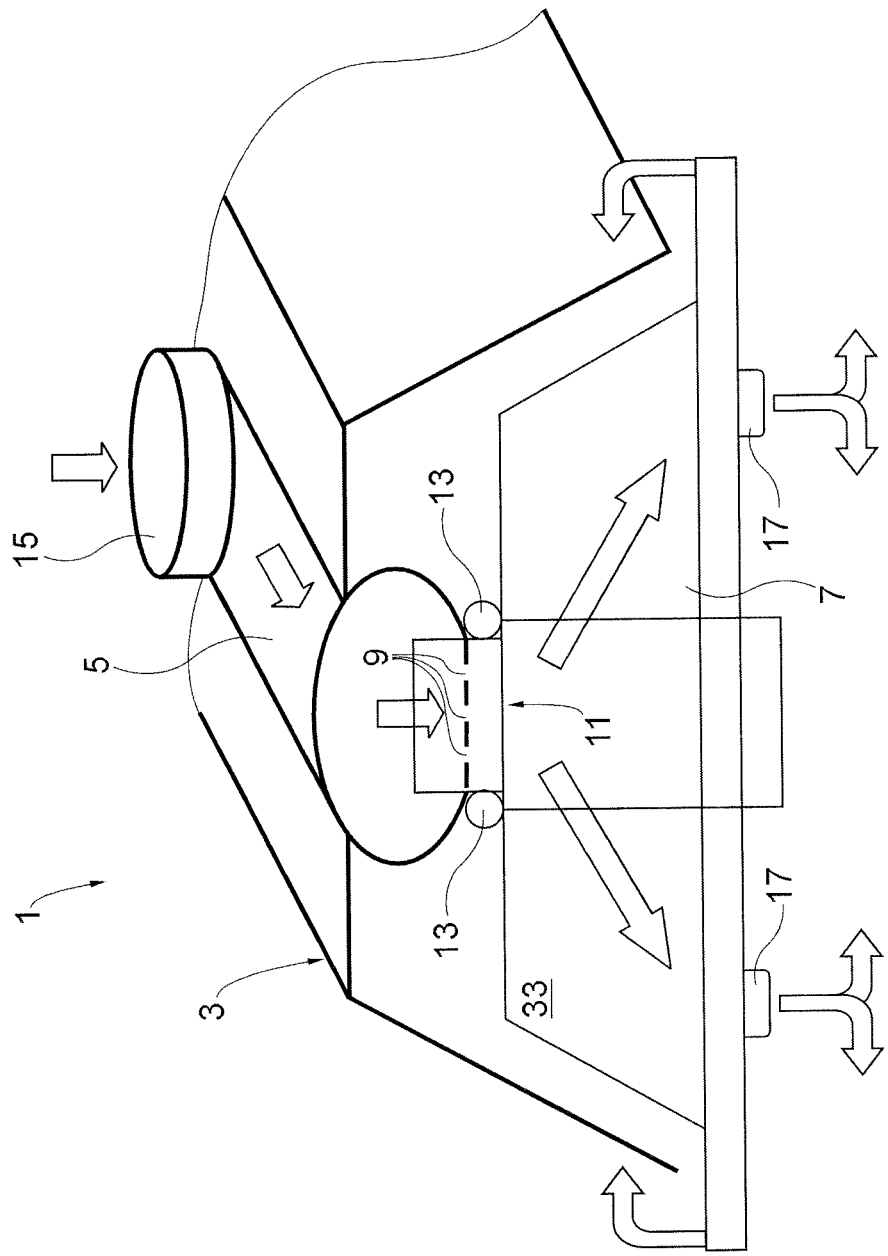
FIG. 1 diagrammatically shows a supply channel according to an embodiment of the present invention.

The supply channel 1 diagrammatically shown in FIG. 1 comprises an elongated housing 3 that is open towards the bottom. A hollow profile 5 is integrated in the housing. An air shower 7 is fastened to the housing 3 (Note: the fastening elements are not shown in FIG. 1).

In the hollow profile 5, on a generated surface directed downwards, there are a multitude of perforation openings 9. An air inlet 11 of the air shower 7 rests against the generated surface of the hollow profile 5 so as to be sealed in an airtight manner by a seal 13.

As indicated by the arrows shown in FIG. 1, fresh air or air-conditioned air can be led from a central inlet 15 of the hollow profile through the hollow profile 15, for example along the longitudinal direction of a vehicle. The air can then reach the air inlet 11 of the air shower 7 by way of the perforation openings 9, and from there it can be fed to air outlets 17 by way of a plenum 33. In this arrangement the air outlets 17 can be both closed and directionally swiveled.

Figure 2:
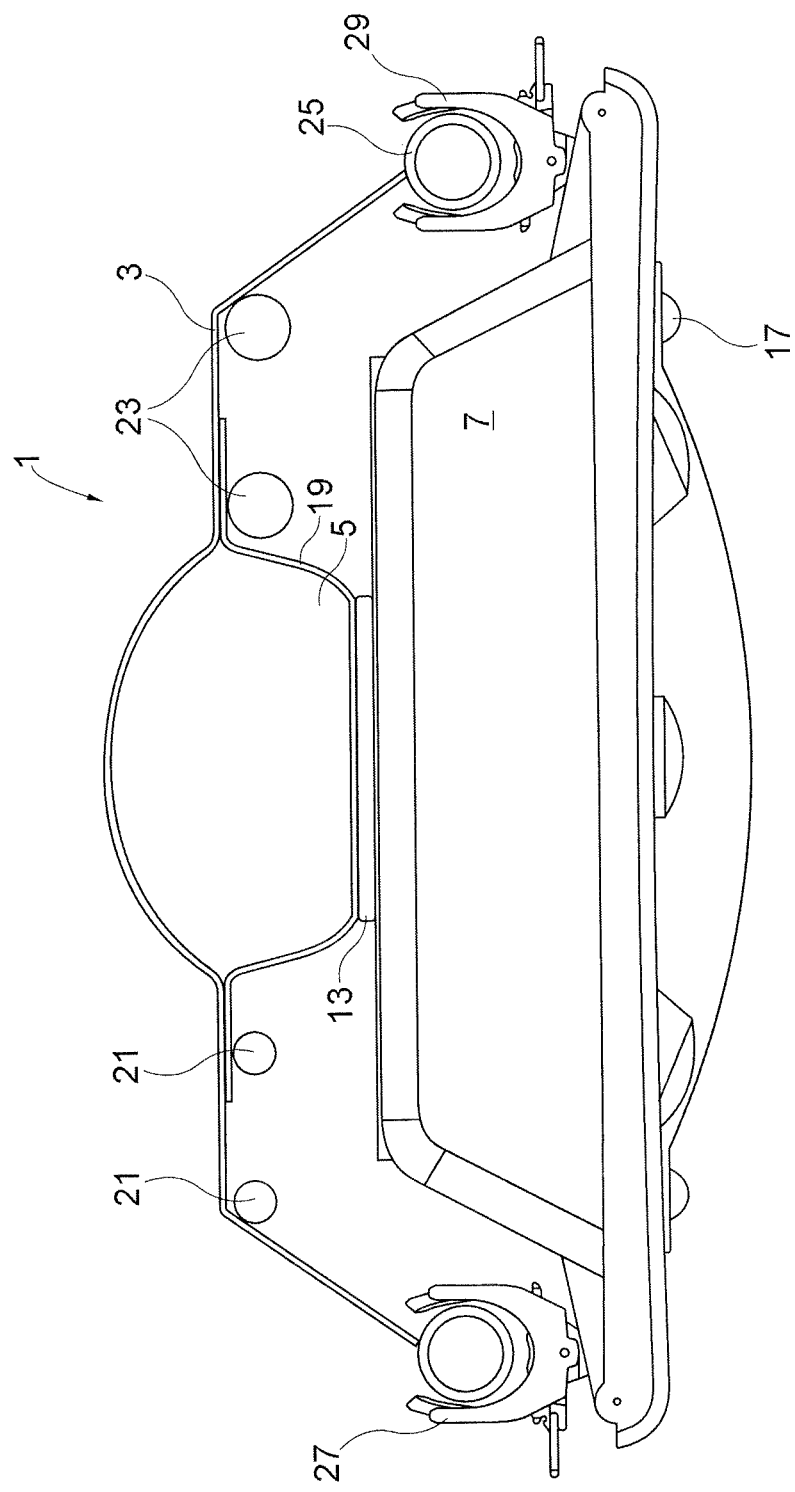
FIG. 2 shows a cross section of a supply channel according to a further embodiment of the present invention.

As shown in FIG. 2, the hollow profile 5 can be an integral part of the housing 3. In this arrangement an upper semi-profile that is approximately U-shaped is formed by the housing 3, while a lower U-shaped semi-profile is formed by a separate mounted part 19 that is connected to the housing 3 so as to be airtight, so that a tubular hollow profile 5 is formed.

Apart from the air shower 7, further mounted elements can be provided in the housing 3 of the supply channel 1, which mounted elements can be supplied by way of lines 21, 23.

As shown in FIG. 2, a tubular fastening reinforcement 25 is provided on the two edges of the housing 3, which edges extend in longitudinal direction of the housing. Fastening devices 27 that are provided on the air shower 7 act on this fastening reinforcement 25. These fastening devices 27 are preferably designed such that they partly encompass the fastening reinforcement 25, wherein clamping jaws 29 can be pressed together for establishing clamping contact with the fastening reinforcement 25.

Figure 3:
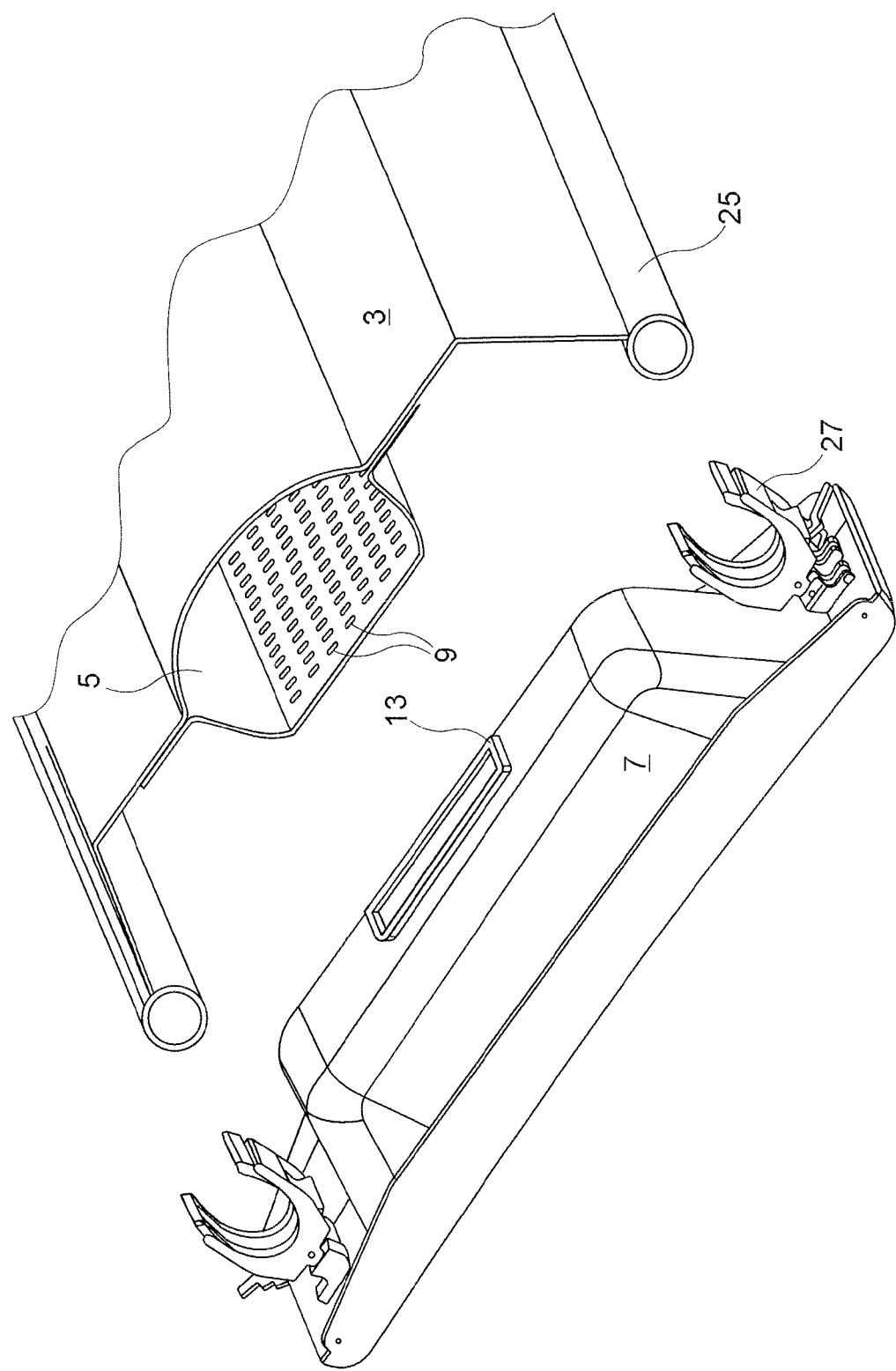
FIG. 3 shows a perspective view of the supply channel shown in FIG. 2, with the air shower de-installed.

FIG. 3 shows that the downward directed generated surface of the hollow profile 5 comprises seven rows of perforation openings, arranged one beside the other. Each perforation opening has a diameter of a few mm, and the rows of perforation openings are laterally spaced apart from each other by a few cm. Each row comprises a multitude of perforation openings 9 adjacent in longitudinal direction of the housing, wherein the space between adjacent perforation openings approximately equals the diameter of a perforation opening (i.e., is a few mm). The generated surface of the hollow profile, which generated surface comprises the perforation openings 9, is essentially flat.

On the air shower 7 a rectangular seal 13 is shown, which is closed in a ring-shaped manner. In the installed state, in other words when the air shower 7 is held on the fastening reinforcements 25 of the housing by way of the fastening devices 27, the seal 13 rests against the generated surface of the hollow profile 5, thus sealing the air shower 7 against the hollow profile 5. The geometry of the seal 13 is such that all seven perforation openings, which are arranged one beside the other, of one or several lines of perforation openings together lead into the air inlet 11 enclosed by the seal 13.

Figure 4:
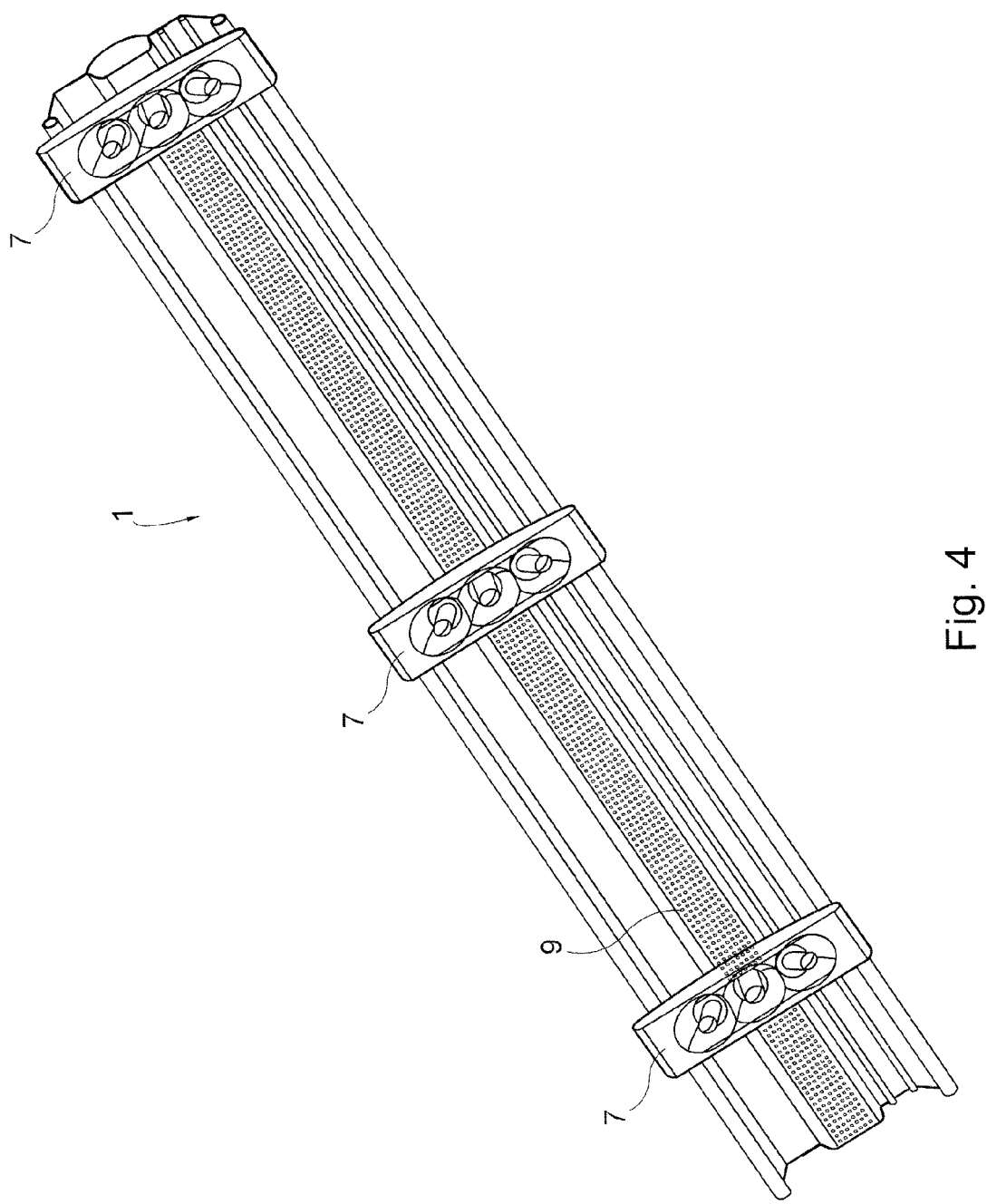
FIG. 4 shows a bottom view of the supply channel shown in FIG. 2.

FIG. 4 shows a supply channel 1 to which three air showers 7 are affixed, spaced apart from each other, along a longitudinal direction. Perforation openings 9 are shown between the adjacent air showers 7, which perforation openings 9 do not lead into an air inlet 11 of an air shower. These non-covered perforation openings 9 are sealed off by an adhesive film or foil (not shown). The adhesive film or foil is placed over the non-covered generated surface of the hollow profile 5, thus sealing the non-connected perforation openings in an airtight manner.

When the spacing between adjacent air showers 7 is to be changed, the adhesive film or foil can simply be peeled off, the air showers can be displaced along the fastening reinforcement 25, and subsequently a new adhesive film or foil can be cut out and pressed on.

Figure 5:
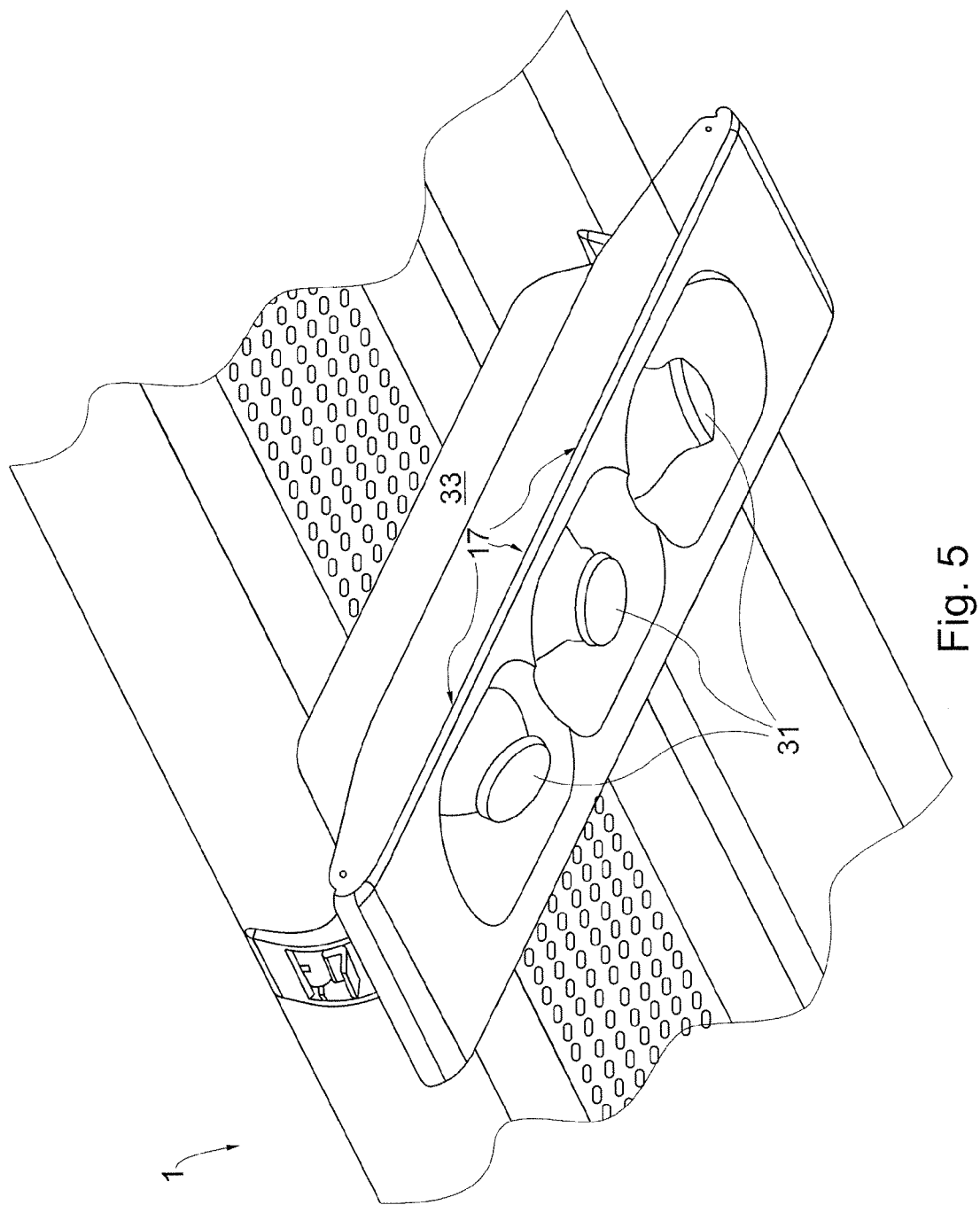
FIG. 5 shows an enlarged bottom view of a section of the supply channel shown in FIG. 2.

FIG. 5 shows that an individual air shower that is supplied with air by way of an air inlet comprises three separate air outlets 17 that can be directed in various directions. As shown in FIG. 1 in a similar manner, the air outlets that comprise air nozzles 31 lead to a shared plenum 33 within the air shower, which plenum 33 is in turn connected to the air inlet 11.

Figure 6:
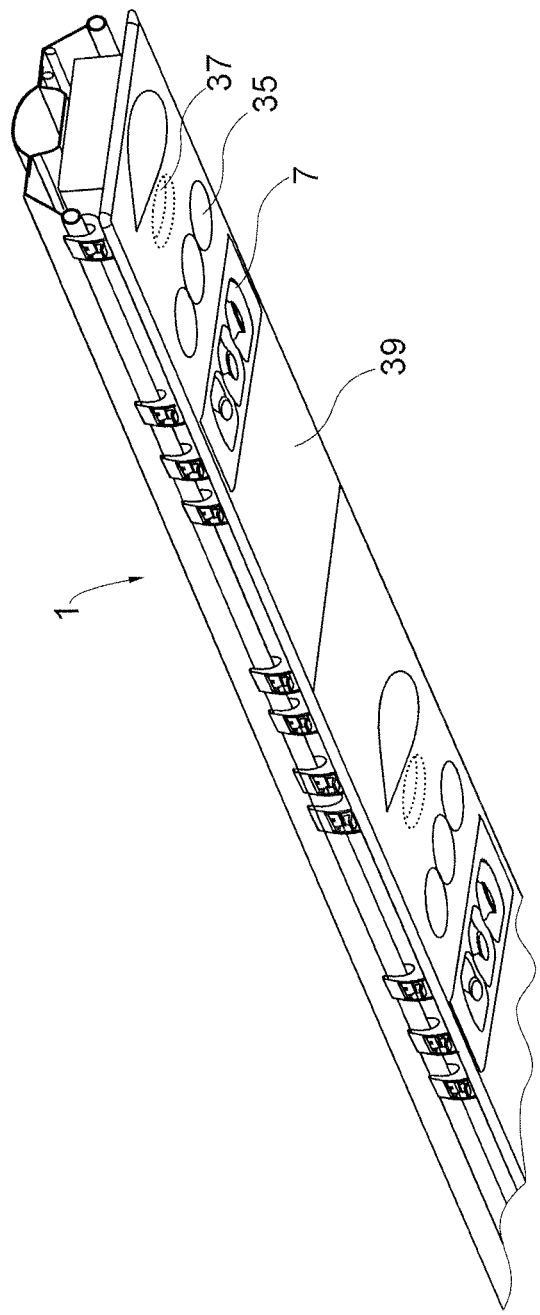
FIG. 6 shows a perspective view of the supply channel shown in FIG. 2, with further trim panel elements and mounted elements.

FIG. 6 shows a supply channel 1 in which, apart from the air showers 7, further service- and trim panel elements are provided, for example reading lamps 35 and loudspeakers 37 as well as trim panel elements 39 situated in between. The individual elements 7, 35, 37, 39 can be designed as separate modules, which depending on requirements can be affixed to the supply channel and can be variably fastened in various positions along the supply channel.

Lastly, it should be pointed out that the terms "comprising", "including" etc. do not exclude the presence of other elements. The terms "a", "one" and similar do not exclude the presence of a plural number. Reference characters in the claims are only provided for better legibility and are in no way designed to limit the protective scope of the claims. Moreover, at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A supply channel with an air distribution system for vehicles, the supply channel comprising:
an elongated housing;
a hollow profile extending in a longitudinal direction of the elongated housing; and
at least one air shower having a selectively adjustable air flow path comprising an air inlet and at least one air outlet, the at least one air outlet being movable to provide the selectively adjustable air flow path,
wherein the hollow profile has a surface defining a plurality of substantially uniformly sized perforation openings; and
wherein the air inlet of the at least one air shower is configured to rest tightly against the surface of the hollow profile so that a sub plurality of the plurality of perforation openings are in communication with the air inlet of the at least one air shower and a second sub plurality of openings are not in communication with the air inlet.

2. The supply channel of claim 1, wherein a cross-sectional area of a perforation opening is less than a second cross-sectional area of the air inlet of the at least one air shower.

3. The supply channel of claim 1, wherein the perforation openings are designed so that in a second longitudinal direction the perforation openings are equidistant along the generated surface.

4. The supply channel of claim 1, further comprising a cover device for a substantially airtight covering of the perforation openings that do not lead into the air inlet of the at least one air shower.

5. The supply channel of claim 4, wherein the cover device comprises an adhesive film.

6. The supply channel of claim 4, wherein the cover device comprises an adhesive foil.

7. The supply channel of claim 1, wherein the hollow profile is designed so as to form an integral part of the elongated housing.

8. The supply channel of claim 1, wherein the at least one air shower comprises a seal along the air inlet.

9. The supply channel of claim 1, further comprising a fastening device in order to fasten the at least one air shower to the elongated housing.

10. An aircraft, comprising:
an air distribution system; and
a supply channel with the air distribution system, the supply channel comprising:
an elongated housing;
a hollow profile extending in a longitudinal direction of the elongated housing; and
at least one air shower having a selectively adjustable air flow path comprising an air inlet and at least one air outlet the at least one air outlet being movable to provide the selectively adjustable air flow path,
wherein the hollow profile has a surface including a plurality of substantially uniformly sized perforation openings; and
wherein the air inlet of the at least one air shower is couplable tightly against the surface of the hollow profile such that when the air shower is coupled to the surface of the hollow profile, a sub plurality of the plurality of perforation openings are in communication with the air inlet of the at least one air shower and a second sub plurality of openings are not in communication with the air inlet.

11. A method for producing a supply channel comprising an air distribution system in a vehicle comprising:
providing the supply channel, the supply channel comprising:
an elongated housing;
a hollow profile extending in a longitudinal direction of the elongated housing, the hollow profile having a surface defining a plurality of substantially uniformly sized perforation openings; and
at least one air shower having a selectively adjustable air flow path comprising an air inlet and at least one air outlet,
coupling the at least one air shower to the generated surface of the hollow profile such that a sub plurality of the plurality of perforation openings are in communication with the air inlet of the at least one air shower; and
sealing the perforation openings of the hollow profile that are not in communication with the air inlet of the at least one air shower.

12. The method of claim 11, wherein the perforation openings are sealed by means of an adhesive tape.

* * * * *

UNITED STATES PATENT AND TRADEMARK OFFICE
CERTIFICATE OF CORRECTION

| | | |
|---|---|---|
| PATENT NO. | : 8,454,415 B2 | |
| APPLICATION NO. | : 12/566207 | |
| DATED | : June 4, 2013 | |
| INVENTOR(S) | : Anja Nitsche et al. | |

It is certified that error appears in the above-identified patent and that said Letters Patent is hereby corrected as shown below:

In the Claims

Claim 10, Column 8, Line 13, insert --,-- before the following phrase: --the at least one air outlet being movable to provide the selectively adjustable air flow path--

Signed and Sealed this
Nineteenth Day of November, 2013

Teresa Stanek Rea
*Deputy Director of the United States Patent and Trademark Office*